Dec. 11, 1962     P. M. ERLANDSON     3,068,345
ELECTRICAL SEPARATION OF WELDED CAN BODIES
Filed July 6, 1960
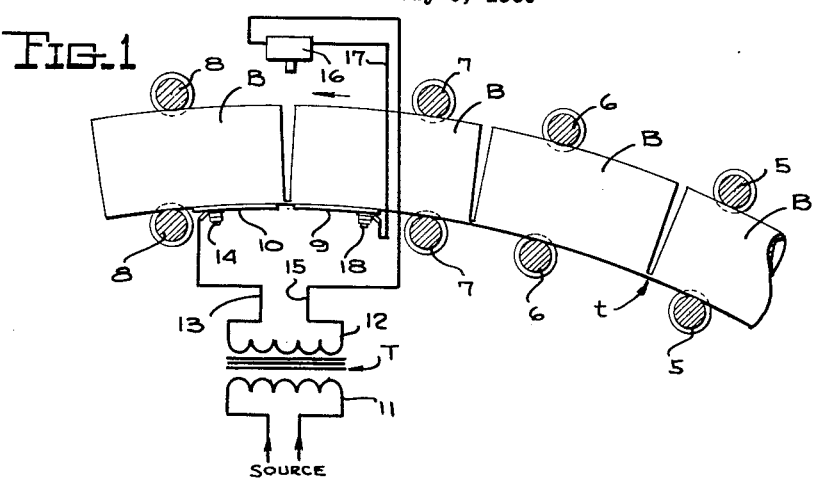
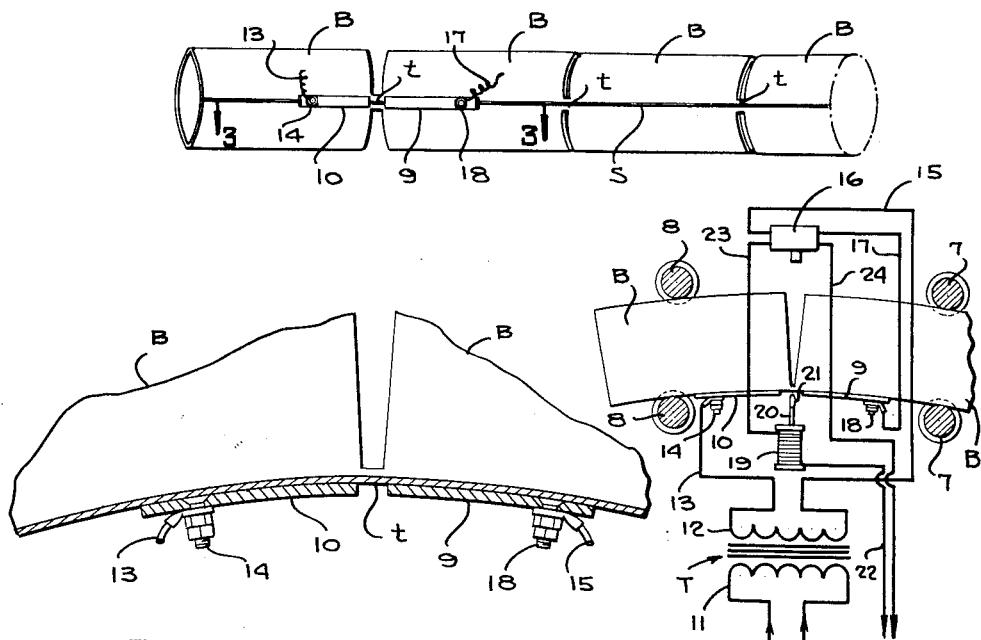
INVENTOR.
PAUL M. ERLANDSON
BY
Mason, Porter, Diller & Stewart
ATTORNEYS

United States Patent Office 3,068,345
Patented Dec. 11, 1962

3,068,345
ELECTRICAL SEPARATION OF WELDED
CAN BODIES
Paul M. Erlandson, New Canaan, Conn., assignor to Continental Can Company, Inc., New York, N.Y., a corporation of New York
Filed July 6, 1960, Ser. No. 41,054
18 Claims. (Cl. 219—68)

This invention relates in general to new and useful improvements in the art of forming can bodies, and more particularly relates to a novel method of and apparatus for electrically separating can bodies connected together by connecting tabs, the can bodies being formed from a tube having a welded seam.

For many years, it has been the desire of can makers to form can bodies from an elongated tube. Heretofore, there have been two major obstacles. The first of these is obtaining a welded seam which may be constantly produced in thin gauge metal, such as those used in the making of can bodies, wherein the seam has the desired strength and sealing characteristics. The other of the obstacles has been the separating of the tube into individual can bodies.

Heretofore, it has been proposed to form can bodies by first forming a tube having a welded seam from elongated strips of sheet material, which strips have been pre-scored to provide weakening lines which extend generally transversely about the circumference of the tube. After the tube has been welded, the can bodies have been separated by breaking the tube along the weakening lines thereof. While the breaking of the tube along the weakening lines may be readily accomplished, the can bodies normally remain connected together by connecting tabs which are coextensive with the welded seam. In the past, these connecting tabs have been broken by twisting the can bodies. This procedure has proven to be unsuccessful in that in many instances, the connecting tabs have not broken, and where the connecting tabs have broken, the ends of the can bodies have been unduly deformed so as to prevent the formation of a proper flange on the end of the can body, which flange has connected thereto in sealed relation a can end.

The present invention has as an object the separation of the connected together can bodies by electrically removing the connecting tabs between the can bodies. It is proposed to accomplish this electrical removing of the connecting tab by rapidly heating the connecting tabs to a relatively high temperature by passing an electric current therethrough, and then applying either a tensile or a shearing stress to the heated connecting tabs.

Another object of the invention is to provide a novel apparatus for severing or removing connecting tabs which extend between and connect together can bodies and like tubular members, the apparatus including means for feeding the can bodies in an arcuate path with adjacent can bodies separated except for the connecting tabs extending therebetween, the feeding of the can bodies being accomplished by rollers which are driven at differential speeds to result in the tensioning of the connecting tabs, and the connecting tabs bridging a pair of electrodes while under tension so that current flows therethrough and rapidly heats the connecting tabs to a temperature which, when combinde with the tensile stress in the connecting tabs, will result in the severing or removal of the connecting tabs.

Another object of the invention is to provide a novel apparatus for severing or removing connecting tabs between can bodies and like tubular members, the apparatus including means for guiding the connected together can bodies and for driving the can bodies in an arcuate path with the can bodies spaced from each other with the exception of the connecting tabs therebetween, there being disposed along the path of the can bodies contacting electrodes which engage the can bodies along the paths of the connecting tabs therebetween so that when the connecting tabs bridge the contacting electrodes, current is passed through the connecting tabs to result in the rapid heating thereof to a relatively high temperature, which temperature, when combined with a tensile stress on the connecting tabs, will result in the severing or removal of the connecting tabs, and there being provided timing means for timing the introduction of current into the contacting electrodes with the bridging of the electrodes by the connecting tabs.

Still another object of the invention is to provide a novel apparatus for removing or severing connecting tabs extending between adjacent can bodies and like tubular members, the apparatus including a pair of contacting electrodes which may be bridged by the connecting tabs whereby electrical current will pass through the connecting tabs to rapidly heat the connecting tabs to high temperatures, and there also being provided means operative in timed relation to the movement of the can bodies to apply a shearing force on the connecting tabs after they have been heated to a relatively high temperature, the combined effects of the heating of the connecting tabs to high temperatures and the shearing force thereon being sufficient to sever or remove the connecting tabs.

A further object of the invention is to provide a novel method of separating interconnected can bodies by the severing or removal of connecting tabs extending therebetween, the apparatus being of a nature so as to function while the can bodies are moving at a relatively high linear rate, and with the severing or removal of the connecting tabs being accomplished by a combination of electrically heating the connecting tabs to a relatively high temperature and either applying a tensile or shearing force on the heated connected tabs.

Still another object of the invention is to provide a novel method of severing or removing connecting tabs extending between can bodies and like tubular members, the method including the passing of the can bodies along an arcuate path so that the can bodies are separated with the exception of the connecting tabs, electrically heating the moving connecting tabs to a relatively high temperature, and applying either a tensile or a shearing stress on the heated connecting tabs to sever or remove the same.

With the above, and other objects in view that will hereinafter appear, the nature of the invention will be more clearly understood by reference to the following detailed description, the appended claims, and the several views illustrated in the accompanying drawing.

In the Drawing:

FIGURE 1 is a schematic view showing a first apparatus for removing or severing connecting tabs between can bodies by electrically heating the can body connecting tabs and applying a severing force thereon.

FIGURE 2 is a bottom plan view of the apparatus of FIGURE 1, with portions thereof removed, only the several can bodies and the contacting electrodes being shown.

FIGURE 3 is an enlarged fragmentary vertical sectional view taken along the line 3—3 of FIGURE 2, and shows the specific relationship of a connecting tab with respect to the two contacting electrodes.

FIGURE 4 is a fragmentary schematic view similar to FIGURE 1, and shows a modified form of connecting tab removing or severing apparatus, which apparatus includes a shear.

In FIGURES 1 and 2 of the drawings, there is illustrated a plurality of can bodies B which are connected together by connecting tabs *t*. The can bodies B are initially formed as part of a continuous tube having a welded seam S. The can bodies B are then separated from their tubular form by breaking of the tube at spaced intervals, the breaking of the tube breaking all bonds between adjacent can bodies with the exception of the connecting tabs $t$, which connecting tabs run coextensive with the welded seam S.

In a practical application of the invention, the interconnected can bodies B are passed along an arcuate path, with the connecting tabs $t$ being disposed innermost, and the path of the connecting tabs having a lesser radius than the path of any other part of each can body. This path is generally defined by a first set of guide rollers 5, a second set of guide rollers 6, a first set of drive rollers 7, and a second set of drive rollers 8. The rollers 5, 6, 7 and 8 may be of any desired configuration, although it is preferred that they be of an hourglass configuration so that they may effectively support the can bodies B against lateral movement.

The second set of drive rollers 8 are driven so that they advance the can bodies at a linear rate greater than the effective driving rate of the drive rollers 7. As a result, the portions of the can bodies B disposed between the drive rollers 7 and 8 are in tension with a tensile stress being placed on the connecting tabs $t$ disposed between the drive rollers 7 and 8.

A pair of spaced contacting electrodes 9, 10 are disposed alongside the path of the tabs $t$. The electrodes 9, 10 are elongated in the direction of movement of the tabs $t$ and are in end-to-end relation with adjacent ends thereof spaced apart a distance at least equal to the length of a connecting tab, which connecting tab is very narrow, although it has been exaggerated in the drawings. As the can bodies B pass along the predetermined arcuate path, they ride over the contacting electrodes 9 and 10 with the welded seam S engaging the contacting electrodes 9, 10.

The electrical circuit for the contacting electrodes 9, 10 includes a transformer T. The transformer T includes a primary winding 11 and a secondary winding 12. One wire 13 connects the winding 12 to a terminal 14 on the contacting electrode 10. Another wire 15 connects the opposite end of the winding 12 to a control device 16. A third wire 17 connects the control device 16 to a terminal 18 of the contacting electrode 9.

The current supplied to the contacting electrodes 9, 10 may be A.C., D.C. or pulsed A.C. or D.C. By a proper choice of frequency, amplitude, and "on" time of the current made to flow in the connecting tab $t$, the connecting tab may be burned or heated so that the can bodies B may be separated. It is preferred that current flow be limited to that time that the connecting tab $t$ is bridging the gap between the contacting electrodes 9, 10. It is to this end that the control device 16 is provided. The control device 16 is in the form of a sensing device to determine when the connecting tab $t$ bridges the contacting electrodes 9, 10. It may be in the form of an optical sensing device, an electrical transducer, or other equivalent devices. It may also be placed in the power source line in lieu of being placed in the line between the secondary winding 12 and the contacting electrodes 9, 10.

In practice, the invention has been utilized with a 100 amp, 2.5 volt, 60 cycle filament transformer. However, it is to be understood that other electrical potentials may be utilized.

It is to be understood that the removal of the connecting tab $t$ may be accomplished by a direct burning off of the connecting tab. However, it has been found advisable to combine the heating of the connecting tab and the partial burning thereof with the application of a stress in the connecting tab, either a tensile stress or a shearing stress. In the form of the invention illustrated in FIGURE 1, the heating and partial burning of the connecting tab is coupled with the application of a tensile force in the heated connecting tab to effect the severing or removal thereof.

Reference is now made to FIGURE 4 of the drawing wherein a modified form of apparatus is illustrated. This apparatus incorporates all of the structure of the apparatus of FIGURE 1. However, it is preferred that the rollers 7 either be idler rollers, or if they are drive rollers, they be driven at the same rate as are the drive rollers 8 so that a tensile force is not necessarily developed in the connecting tab $t$.

On the other hand, the apparatus of FIGURE 4 incorporates a shear applying device which takes the form of an electromagnetic operator 19 having a plunger shaft 20 which supports a knife 21 or other type of shear applying device. It is to be noted that the knife 21 is intended for reciprocation between the contacting electrodes 9, 10 and transversely of the connecting tab $t$. It is intended that the operation of the electromagnetic device 19 be synchronized with the positioning of the connecting tab $t$ in a position bridging the contacting electrodes 9, 10. Accordingly, one terminal of the electromagnetic device 19 has a lead wire 22 connected thereto and extending to a power source. The other terminal of the electromagnetic device has a wire 23 connected thereto, which wire is suitably connected to the control device 16. A wire 24 extends from the control device 16 to the power source, with the wire 22. It thus will be seen that the operation of the electromagnetic device 19 and the knife 21 is controlled by the control device 16.

With the apparatus of FIGURE 4, the connecting tab $t$ is heated to a high temperature by the completing of the circuit across the ends of the secondary winding 12 by both the control device 16 and the connecting tabs $t$. At substantially the same time, although the control device 16 may be built with a slight delay device (not shown), the electromagnetic device 19 is energized by the closing of the circuit thereto through the control device 16 to actuate the knife 21, which knife 21 will strike the heated connecting tab $t$ and apply a shearing force thereto, which shearing force, together with the electrical heating and partial burn-off, will be sufficient to effect the severing or removal of the connecting tab $t$.

From the foregoing, it will be readily apparent that there has been devised an extremely simple, yet highly effective, apparatus for severing the connecting tabs between adjacent can bodies while the can bodies are moving at a relatively high rate. Further, the severing or removing of the connecting tabs is accomplished in a manner which assures the proper removal of the connecting tab and the elimination of damage to the can body end to permit the proper flanging thereof so that a can end may be secured on the can body.

Although the term can body has been applied to the member B, it is to be understood that the member B may be any tubular member, and will preferably be in the form of a blank. Therefore, the invention is not necessarily limited to the separation of can bodies, but may be readily applied to the separation of any tubular members from an integral tube form.

From the foregoing, it will be readily apparent that novel and advantageous provision has been made for carrying out the desired end. However, attention is directed to the fact that variations may be made in the example method and apparatus disclosed herein without departing from the spirit and scope of the invention, as defined in the appended claims.

I claim:

1. In the process of forming can bodies and the like wherein a strip having transverse score lines is shaped into continuously seamed tubular configuration, and wherein the tube is broken into individual tab-connected sections at the score line; the method of severing tabs comprising the steps of continuously moving the tab-connected tube sections in an arcuate path, of introducing electrical energy into adjacent tube sections for passage through a connecting tab, thereby to heat and weaken said tab, and of stressing said tab thereby to sever the connection betwen adjacent tab-connected tube sections.

2. In the process of forming can bodies and the like wherein a strip having transverse score lines is shaped into continuously seamed tubular configuration, and wherein the tube is broken into individual tab-connected sections at the score lines; the method of severing tabs comprising the steps of continuously moving the tab-connected tube sections in an arcuate path, of introducing electrical energy into adjacent tube sections for passage through a connecting tab in timed relation to the movement of adjacent tube sections, thereby to heat and weaken said tab, and of stressing said tab thereby to sever the connection between adjacent tab-connected tube sections.

3. In the process of forming can bodies and the like wherein a strip having transverse score lines is shaped into continuously seamed tubular configuration, and wherein the tube is broken into individual tab-connected sections at the score lines; the method of severing tabs comprising the steps of continuously moving the tab-connected tube sections in an arcuate path, of introducing electrical energy into adjacent tube sections for passage through a connecting tab, thereby to heat and weaken said tab, and of tensioning said tab thereby to sever the connection between adjacent tab-connected tube sections.

4. In the process of forming can bodies and the like wherein a strip having transverse score lines is shaped into continuously seamed tubular configuration, and wherein the tube is broken into individual tab-connected sections at the score lines; the method of severing tabs comprising the steps of continuously moving the tab-connected tube sections in an arcuate path, of introducing electrical energy into adjacent tube sections for passage through a connecting tab, thereby to heat and weaken said tab, and of shearing said tab thereby to sever the connection between adjacent tab-connected tube sections.

5. In the process of forming can bodies and the like wherein a strip having transverse score lines is shaped into continuously seamed tubular configuration, and wherein the tube is broken into individual tab-connected sections at the score lines; the method of severing tabs comprising the steps of continuously moving the tab-connected tube sections in an arcuate path, of introducing electrical energy into adjacent tube sections for passage through a connecting tab, thereby to heat and weaken said tab, and of moving the leading one of said two adjacent tube sections at a velocity greater than the other one of said two adjacent tube sections, thereby to sever the connection between said adjacent tab-connected tube sections.

6. In the process of forming can bodies and the like wherein a strip having transverse score lines is shaped into continuously seamed tubular configuration, and wherein the tube is broken into individual tab-connected sections at the score lines; the method of severing tabs comprising the steps of continuously moving the tab-connected tube sections in an arcuate path, of introducing electrical energy into adjacent tube sections for passage through a connecting tab, thereby to heat and weaken said tab, and of simultaneously tensioning and shearing said tab thereby to sever the connection betwen adjacent tab-connected tube sections.

7. Apparatus for electrically separating individual tubular members connected together by tabs comprising means for moving said tubular members along a predetermined path, a pair of contacting electrodes, the electrodes of said pair being disposed along said path in spaced arrangement, whereby individual ones of the tabs are successively disposed between said contacting electrodes in bridging relation, means for applying electrical energy to said contacting electrodes for passage through selected tabs, therdeby to heat said tabs, and means for applying a separating force on the tabs as the tabs are disposed between said contacting electrodes.

8. Apparatus in accordance with claim 7 wherein said moving means comprises means for guiding said members along an arcuate path and wherein said connecting-together tabs are disposed in a substantially linear arrangement corresponding to said predetermined path, the linear arrangement of said tabs having a smaller radius of curvature than the arrangement of other portions of said tubular members, whereby end portions of adjacent tubular members remote from said tabs are separated by a distance greater than the distance enforced by said tabs.

9. An apparatus for electrically separating individual tubular members connected together by tabs disposed in alignment, said apparatus comprising means for guiding the tubular members along a predetermined path, a pair of contacting electrodes disposed along said path in spaced aligned relation and in alignment with the path of the tabs whereby individual ones of the tabs may be disposed between said contacting electrodes in bridging relation, and means for supplying electrical energy to said contacting electrodes to be passed through individual tabs to heat and burn away the tabs, said means for supplying electrical energy including synchronizing means for synchronizing the application of electrical energy with the bridging of said contacting electrodes by a tab.

10. An apparatus for electrically separating individual tubular members connected together by tabs disposed in alignment, said apparatus comprising means for guiding the tubular members along a predetermined path, a pair of contacting electrodes disposed along said path in spaced aligned relation and in alignment with the path of the tabs whereby individual ones of the tabs may be disposed between said contacting electrodes in bridging relation, and means for supplying electrical energy to said contacting electrodes to be passed through individual tabs to heat and burn away the tabs, said guiding means being disposed along an arcuate path with the path of the tabs being of a smaller radius than the paths of other portions of the tubular members whereby ends of adjacent tubular members are separated with the exception of the tabs.

11. An apparatus for electrically separating individual tubular members connected together by tabs disposed in alignment, said apparatus comprising means for guiding the tubular members along a predetermined path, a pair of contacting electrodes disposed along said path in spaced aligned relation and in alignment with the path of the tabs whereby individual ones of the tabs may be disposed between said contacting electrodes in bridging relation, means for tensioning the tabs as the tabs bridge said contacting electrodes, and means for supplying electrical energy to said contacting electrodes to be passed through individual tabs to heat and burn away the tabs.

12. An apparatus for electrically separating individual tubular members connected together by tabs disposed in alignment, said apparatus comprising means for guiding the tubular members along a predetermined path, a pair of contacting electrodes disposed along said path in spaced aligned relation and in alignment with the path of the tabs whereby individual ones of the tabs may be disposed between said contacting electrodes in bridging relation, means for supplying electrical energy to said contacting electrodes to be passed through individual tabs to heat and thus weaken the tabs, and means for applying a shear force on the heat weakened tabs as the tabs bridge said contacting electrodes to effect a separation of adjacent tubular members.

13. In the process of forming blanks for can bodies and the like wherein a strip is shaped into tube form including the formation of a continuous seam and then the tube is divided into individual blanks connected together by short tabs extending generally along the seam; a method of electrically separating the individual blanks comprising the steps of continuously moving the connected together blanks, introducing electrical energy into adjacent moving blanks with the electrical energy passing through the tab disposed therebetween and electrically heating the tab to thus weaken the tab, and then completely interrupting the weakened tab to separate the adjacent blanks.

14. In the process of forming blanks for can bodies and the like wherein a strip is shaped into tube form including the formation of a continuous seam and then the tube is divided into individual blanks connected together by short tabs extending generally along the seam; a method of electrically separating the individual blanks comprising the steps of continuously moving the connected together blanks, introducing electrical energy passing through the tab and electrically heating the tab to thus weaken the tab, and then separating the heat weakened tab by applying a shear force thereto.

15. The process of claim 14 wherein both the electrical energy is introduced into the tab and the shear force is applied in timed relation to the movement of the blanks.

16. A method of separating individual tubular members adjacent ones of which are connected together by a single tab comprising the steps of continuously moving the tubular members and guiding the leading one of said tubular members into angular relation relative to the next following one of said tubular members with the tab between the leading tubular member and the next following tubular member being disposed at the closest point between the opposed ends of the leading tubular member and the next following tubular member, introducing electrical energy into the leading tubular member and the next following tubular member for passage through the tab therebetween while the two tubular members are disposed in the aforesaid angular relation, thereby to heat and weaken the tab therebetween, and stressing the tab to thereby sever the connection between the leading tubular member and the next following tubular member.

17. A method of separating individual tubular members adjacent ones of which are connected together by a single tab comprising the steps of continuously moving the tubular members, heating the tabs of the moving tubular member to weaken the tabs, and stressing the tabs while continuing to move the tubular members to thereby sever the connections between the tubular members.

18. An apparatus for separating tubular members connected together by lineally disposed tabs comprising means for guiding said tubular members along a predetermined arcuate path having a curvature towards said tabs whereby tubular member portions remote from said tabs are separated by a distance greater than the member separation enforced by said tabs, means for urging said tubular members along said arcuate path, and means for separating said moving tubular members at said tabs including means for heating said tabs to effect the weakening of said tabs, said tab heating means including a pair of electrodes disposed along said arcuate path in spaced relation and arranged for contacting said tubular members, and means for supplying electrical energy to said contacting electrodes for passage through selected individual ones of said tabs to thereby heat said tabs.

References Cited in the file of this patent

UNITED STATES PATENTS

| | | |
|---|---|---|
| 2,060,561 | Fausset | Nov. 10, 1936 |
| 2,187,740 | Hothersall | Jan. 23, 1940 |
| 2,444,463 | Nordquist | July 6, 1948 |
| 2,444,465 | Peters | July 6, 1948 |
| 2,621,277 | Brewer | Dec. 9, 1952 |